US 6,408,738 B1

(12) United States Patent
Harth et al.

(10) Patent No.: US 6,408,738 B1
(45) Date of Patent: Jun. 25, 2002

(54) ASSISTED BRAKING SYSTEM WITH EMERGENCY BRAKING FUNCTION

(75) Inventors: Ralf Harth, Darmstadt; Holger Von Hayn, Bad Vilbel; Jürgen Schonlau, Walluf; Hans-Jörg Feigel, Rosbach; Steffen Linkenbach, Eschborn-Niederhöchstadt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/786,843
(22) PCT Filed: Jul. 16, 1999
(86) PCT No.: PCT/EP99/05096
§ 371 (c)(1), (2), (4) Date: May 16, 2001
(87) PCT Pub. No.: WO00/13953
PCT Pub. Date: Mar. 16, 2000

(30) Foreign Application Priority Data

Sep. 9, 1998 (DE) .......................... 198 41 150

(51) Int. Cl.$^7$ ................................. F15B 9/10
(52) U.S. Cl. ........................ 91/369.2; 60/582
(58) Field of Search ............. 91/369.2, 376 R; 60/554, 582

(56) References Cited

U.S. PATENT DOCUMENTS

| | | | |
|---|---|---|---|
| 5,146,837 A | * 9/1992 | Inoue | 91/369.2 |
| 5,425,302 A | * 6/1995 | Levrai et al. | 91/369.2 |
| 5,794,506 A | * 8/1998 | Inoue et al. | 91/369.2 |
| 5,819,633 A | * 10/1998 | Satoh | 91/369.2 |
| 5,823,089 A | * 10/1998 | Inoue et al. | 91/369.2 |
| 5,943,938 A | * 8/1999 | Okuno et al. | 91/369.2 |
| 6,192,783 B1 | * 2/2001 | Tobishawa | 91/369.2 |

FOREIGN PATENT DOCUMENTS

| | | |
|---|---|---|
| DE | 42 34 041 | 3/1994 |
| DE | 42 34 043 | 3/1994 |
| DE | 197 50 514 | 5/1999 |
| DE | 197 55 442 | 6/1999 |
| GB | 2 054 777 | 2/1981 |
| JP | 08318846 | 12/1996 |
| JP | 09175373 | 7/1997 |
| JP | 10086812 | 4/1998 |
| WO | 94 00325 | 1/1994 |
| WO | 95 01272 | 1/1995 |

* cited by examiner

Primary Examiner—F. Daniel Lopez
Assistant Examiner—Igor Kershteyn
(74) Attorney, Agent, or Firm—Rader, Fishman & Grauer PLLC

(57) ABSTRACT

The brake force booster 1 with panic brake function includes a control valve, which is arranged in a control housing and operable by way of an input member, for controlling the boosting pressure in a working chamber, the said control valve including an atmosphere sealing seat on a valve piston and a vacuum sealing seat which is arranged on a sliding sleeve that is axially slidably mounted in the control housing. In the event of a panic braking, a quick depression of the brake pedal causes advance movement of the valve piston connected to the input member in relation to the control housing and the sliding sleeve, whereby opening of the atmosphere sealing seat is initiated and a clutch device is actuated which leads to supporting the sliding sleeve in the brake actuation direction on the elastically deformable reaction member, to which latter both the mechanically generated brake force and the pneumatic boosting force is applied. The clutch device is released by withdrawal of the input member. The sliding sleeve is supported on the reaction member by way of a member, by way of which also the mechanical brake force is transmitted to the reaction member.

14 Claims, 4 Drawing Sheets

ASSISTED BRAKING SYSTEM WITH EMERGENCY BRAKING FUNCTION

TECHNICAL FIELD

The present invention generally relates to vehicle brake systems, and more particularly relates to a brake force booster with a panic brake function for automotive vehicles.

BACKGROUND OF THE INVENTION

A brake force booster of this general type is disclosed in the earlier application DE 19750514.7 A1 which is not prior published. In this application, hydraulic provisions are avoided and a brake force booster is disclosed which ensures good controllability of the brake force in the case of normal braking and a high degree of brake force boosting during a panic braking action (quick depression of the brake pedal) along with the possibility of an additional generation (application) of brake force by pedal pressure.

For this purpose, the prior art brake force booster has a clutch device with a sleeve-shaped supporting member interposed between the sliding sleeve and the pressure member. The supporting member, which is supported on a tapered attachment of the valve piston that abuts with its free end on the pressure member, includes on its outside periphery an annular stop with a radial shoulder, at which, in the supporting position of the sliding sleeve, a clutch member makes catch which is pivoted on the sliding sleeve and biased radially inwards by a spring. In the disengaged position B, i.e., before the relative displacement due to a panic braking B, the said clutch member bears without supporting effect on the circumferential surface of the annular stop.

The object of the present invention is to improve and, in particular, simplify the prior art brake force booster, while maintaining all booster functions.

According to the present invention, this object is achieved in that the supporting member is configured as a component part which transmits the brake force.

With the design according to the present invention, it is no longer necessary to assign a supporting member to the sliding sleeve through which the valve piston must be passed. The valve piston, by abutment on the supporting member, can rather transmit the entire mechanical brake force by way of the supporting member onto the pressure member and the reaction member and, if necessary, can even adopt itself the function of the supporting member. This also obviates the need for the pivotable mounting support of the clutch member and a separate spring for biassing the clutch member, for example, by using a spring arm made of spring steel as a clutch member. The use of a permanent magnet for the temporary support of the sliding sleeve in the brake actuation direction is also advantageous. Coupling engagement is then effected by mutual approach of the two parts being coupled, while the disengagement is simply carried out by a relative displacement between the parts, and with one part being retained mechanically by means of a stop.

DETAILED DESCRIPTION OF THE PREFERRED EMBODIMENT

Figure 1:
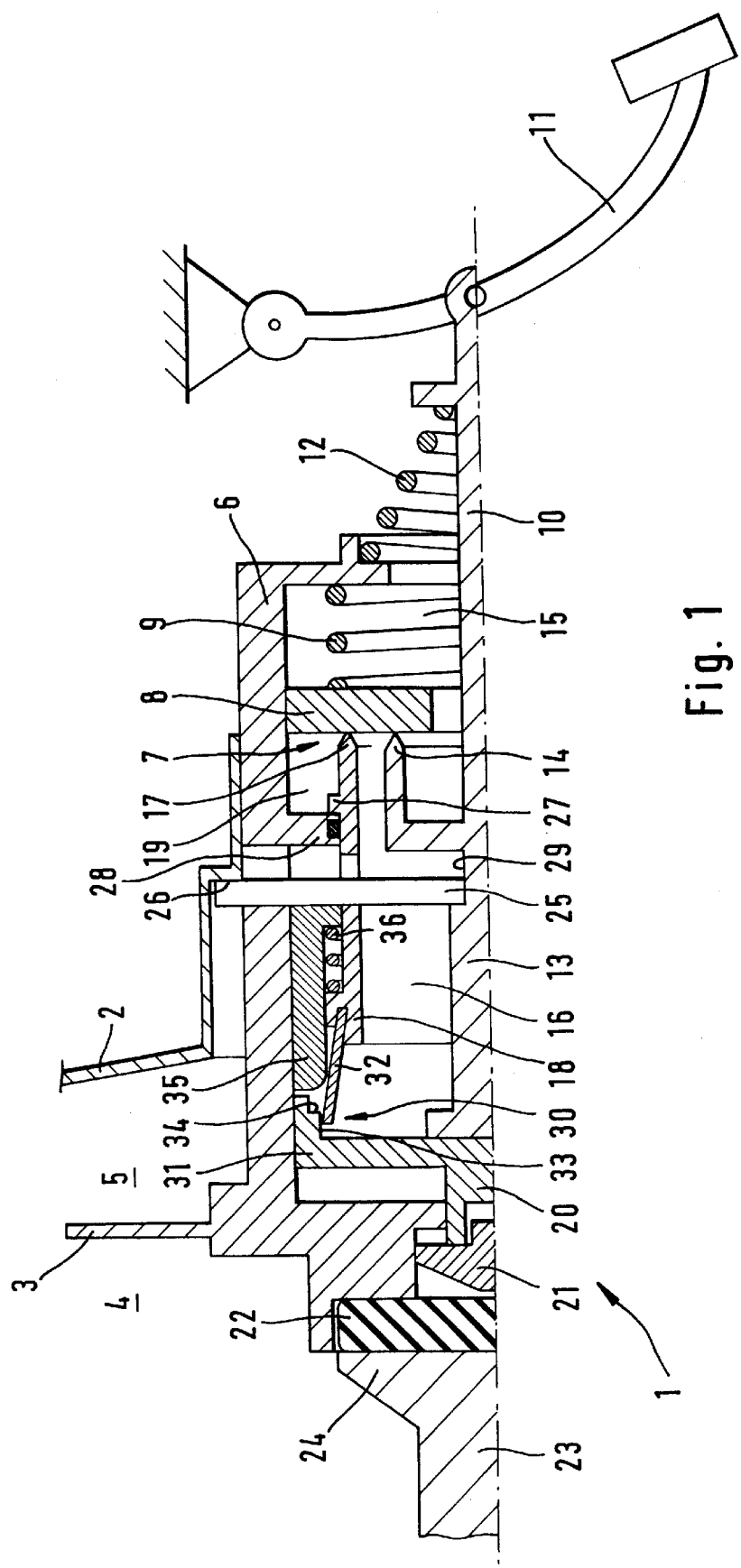
FIG. 1 is a vertical partial cross-sectional view of the top half of the first embodiment of the brake force booster.

Only those parts of the brake force booster 1 according to FIG. 1 are shown which are essential for comprehending the present invention. Booster 1 comprises a booster housing which is subdivided by an axially movable partition wall 3 (shown in part) into a vacuum chamber 4 and a working chamber 5. The axially movable partition wall 3 is comprised of a diaphragm plate and a flexible diaphragm that abuts thereon and forms a rolling diaphragm as a sealant between the outside periphery of the diaphragm plate and the booster housing 2. The partition wall 3 at its inside periphery is connected to a control housing 6.

The control housing 6 accommodates a control valve 7 which comprises a valve member 8 that is biassed by a helical spring 9 to assume a sealing position. A rod-shaped input member 10 extends through the annular valve member 8 and is displaceable in any axial direction alongside the middle of the brake force booster 1 (to the left in the drawing) by depression of a brake pedal 11. When the brake pedal 11 is released, a restoring spring 12 ensures the return movement of the input member 10 into the illustrated initial position in which the brake force booster 1 is ready to brake.

A valve piston 13 is rigidly coupled to the front end of the input member 10. Piston 13 carries an atmosphere sealing seat 14 which cooperates with the valve member 8 and, in the closing position shown, shuts off a ventilation chamber 15 under ambient pressure from a control chamber 16 connected to the working chamber 5. Further assigned to the control valve 7 is a vacuum sealing seat 17 which is arranged on a sliding sleeve 18 that is guided and sealed in the control housing 6 and, in coaction with the valve member 8, shuts off a vacuum channel 19 connected to the vacuum chamber 4 in relation to the control chamber 16. With its front surface, the valve sleeve 13 bears against a catch sleeve 20 which is axially slidably guided in the control housing 6. Catch sleeve 20, in turn, bears with a front surface against a thrust piece 21 which, with a conical or mushroom-type protruding front side, is supported on a rubber-elastic plate-shaped reaction member 22 on which also the control housing 6 with a front annular surface abuts which encloses the thrust piece 21. Thus, the mechanical brake force produced by way of the brake pedal 11 is transmitted to the reaction member 22 by way of the valve piston 13, the catch sleeve 20 and the thrust piece 21, and the pneumatic brake boosting force which is caused by a pressure in the working chamber 5 that is higher than that in the vacuum chamber 4 is transmitted to the reaction member 22 by way of the control housing 6.

The reaction member 22 transmits the brake force or the boosting force to a rod-shaped output member 23 which abuts with a head flange 24 on the reaction member 22. The output member 23 acts in a known manner on the master cylinder (not shown) of the brake system which is fitted to the booster housing half close to the vacuum chamber (not shown). The output member 23 and, hence, also the control housing 6 are biassed by a return spring (not shown) to the right into the initial position according to FIG. 1, in which a U-shaped transverse member 25 embracing the valve piston 13 bears against a housing stop 26 and, thus, defines the initial position (when returned to the right) of the control housing 6 and the valve piston 13. The sliding sleeve 18 is likewise entrained to the right into the initial position by a stop 27 provided on its outside circumference which cooperates with an inner flange 28 of the control housing 6, in which initial position the compressed helical spring 9 urges the valve member 8 against both sealing seats 14, 17. A waist 29 at the valve piston 13 which accommodates the transverse member 25 exceeds in its axial width the size of the transverse member 25 and permits a limited advance movement of the valve piston 13 in relation to the control housing 6 in the brake actuation direction, that is, to the left.

During normal braking operations with a slow depression of the brake pedal 11, however, along with the valve piston 13 and the thrust piece 21 also the control housing 6 with the parts mounted in it including the transverse member 25 is advanced to the left, with no brake force boosting initially effective. Such boosting will not commence until the thrust piece 21 enters the rubber-elastic reaction member 22 and, accordingly, a relative displacement between the control housing 6 and the valve piston 13 occurs. The result is that the atmosphere sealing seat 14 is actuated to open to a limited extent so that pressure develops in the working chamber 5 which is increased compared to the vacuum chamber 4 and furnishes a corresponding brake force boosting effect. This boosting effect is easily controllable by way of the brake pedal 11.

In the event of panic braking operations, i.e., during a quick depression of the brake pedal 11 which is typical of an emergency stop, the valve piston 13 will instantaneously hurry ahead of the control housing 6 and the sliding sleeve 18 in the brake actuation direction so that the atmosphere sealing seat 14 at once lifts from the valve member 8 and the atmospheric pressure that propagates into the working chamber 5 ensures an abruptly commencing full brake force boosting. The thrust piece 21 also makes catch at the reaction member 22 and provides a contribution to the total brake force. Without this mechanically generated brake force, however, the valve piston 13 and the brake pedal 11 remain free from reaction forces which originate from the reaction member 22.

A clutch device 30 is provided in this respect which comprises a supporting member 31 and a clutch member 32 or several clutch members distributed in a circumferential direction. The supporting member 31 is designed as a part of the catch sleeve 20 and has an inner circumferential surface 33 and a radial shoulder 34 which is provided by an indentation in the inner circumferential surface 33. The clutch member 32 configured as a spring arm extends in a slightly inclined fashion relative to the axial brake actuation direction. It is supported with its rear end on the front end of the sliding sleeve 18 and has a bias so that its front end tends to displace in a radially outward direction. This means, when the valve piston 13 and, thus, also the catch sleeve 20 and the supporting member 31 advance to the left during the panic braking operation described hereinabove, the resilient clutch member 32 will catch the indentation and thereby get into engagement with the radial shoulder 34. Accordingly, the sliding sleeve 18 is now supported on the reaction member 22 in the brake actuation direction, and namely indirectly by way of the clutch device 30, the catch sleeve 20, and the thrust piece 21. Therefore, the sliding sleeve 18 and, hence, the vacuum sealing seat 17 in the panic braking position is displaceable only in opposition to the brake actuation direction in relation to the control housing 6. The valve piston 13 which is free from reaction forces can be returned by release of the brake pedal 11 so that the atmosphere sealing seat 14 closes. Upon further piston return movement, the valve member 8 lifts from the vacuum sealing seat 17 so that the pressure in the working chamber 5 drops and the boosting effect declines. In view of the above, the brake force is easily controllable also in the case of panic braking.

In the event of pressure balance between the vacuum chamber 4 and the working chamber 5, and with the brake pedal released, the control housing 6 is shifted to the right under the effect of the so-called return spring, and the sliding sleeve 18 by way of its stop 27 is entrained, and likewise the transverse member 25 until it abuts on the booster housing 2. A release sleeve 35 which is axially slidably guided in the control housing 6 and is supported on the sliding sleeve 18 by way of a helical spring 36 is also entrained until it abuts on the transverse member 25. The further shift of the sliding sleeve 18 leads to a movement relative to the release sleeve 35, and the helical spring 36 is compressed. The clutch member 32 meets the front end of the release sleeve 35 which is rounded in the inner periphery area, is shifted radially inwards and detaches from the radial shoulder 34. Accordingly, again the initial position of FIG. 1 results, out of which a new braking operation (normal braking or panic braking) can be started.

Figure 2:
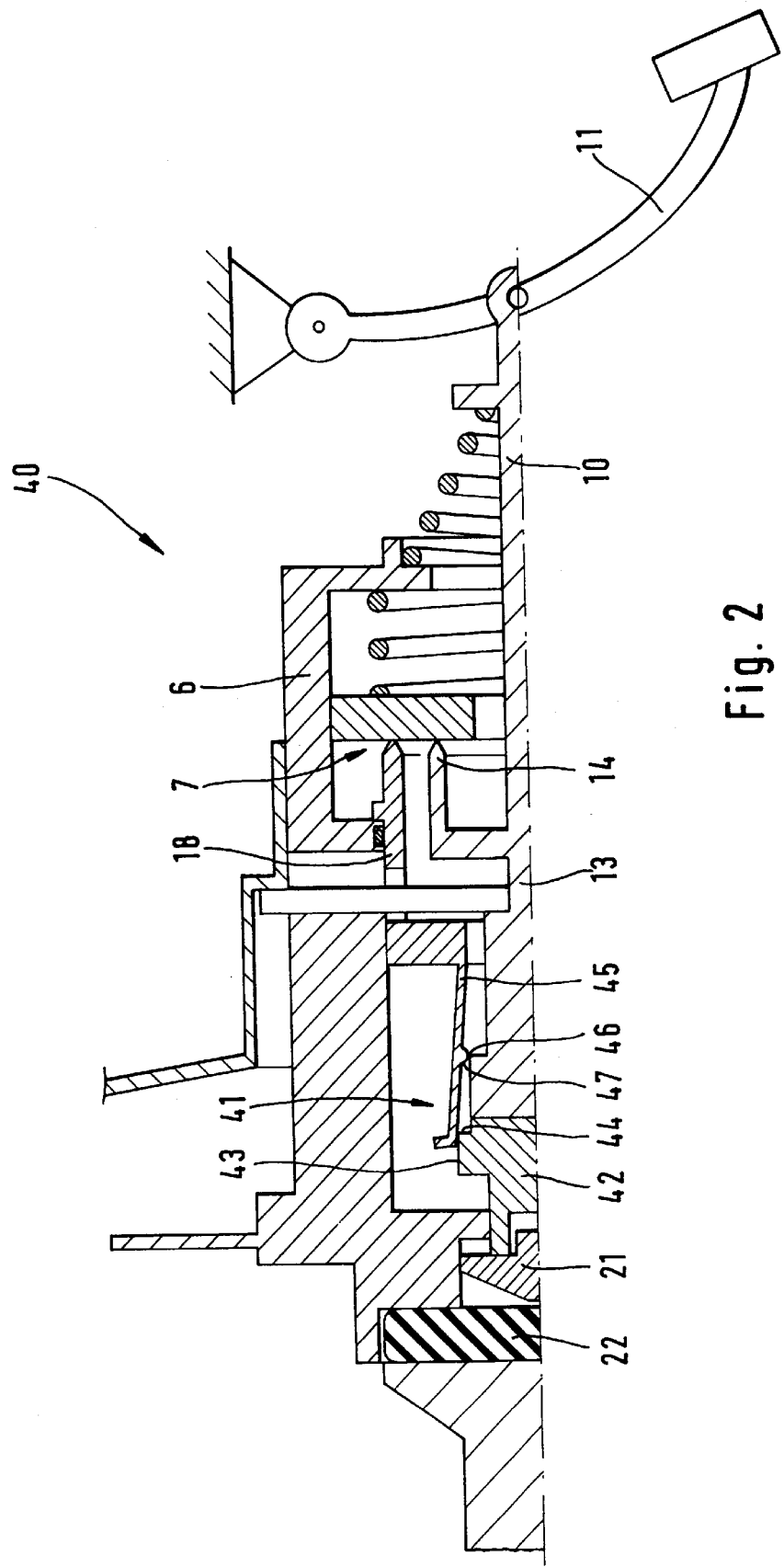
FIG. 2 shows the second embodiment of the brake force booster in an illustration corresponding to FIG. 1.
Figure 3:
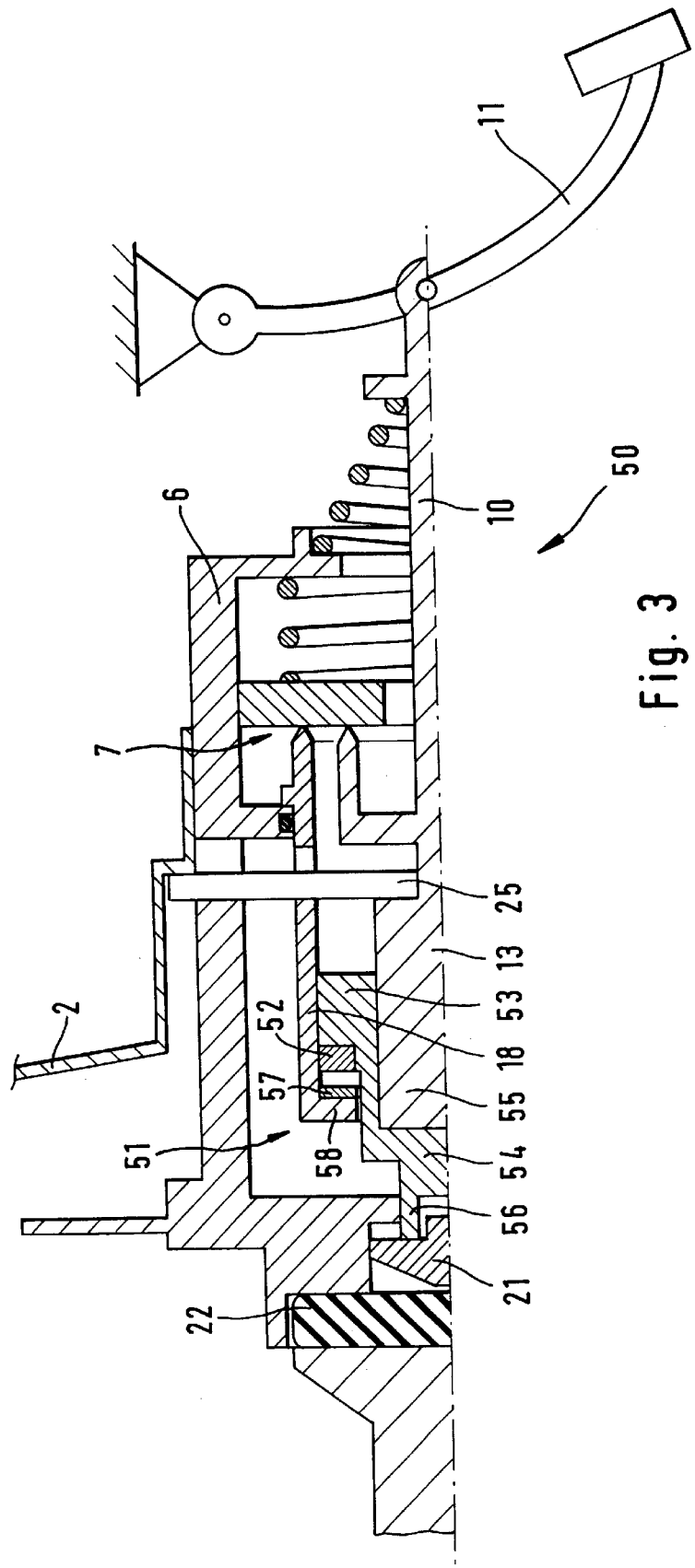
FIG. 3 shows the third embodiment of the brake force booster in an illustration corresponding to FIG. 1.
Figure 4:
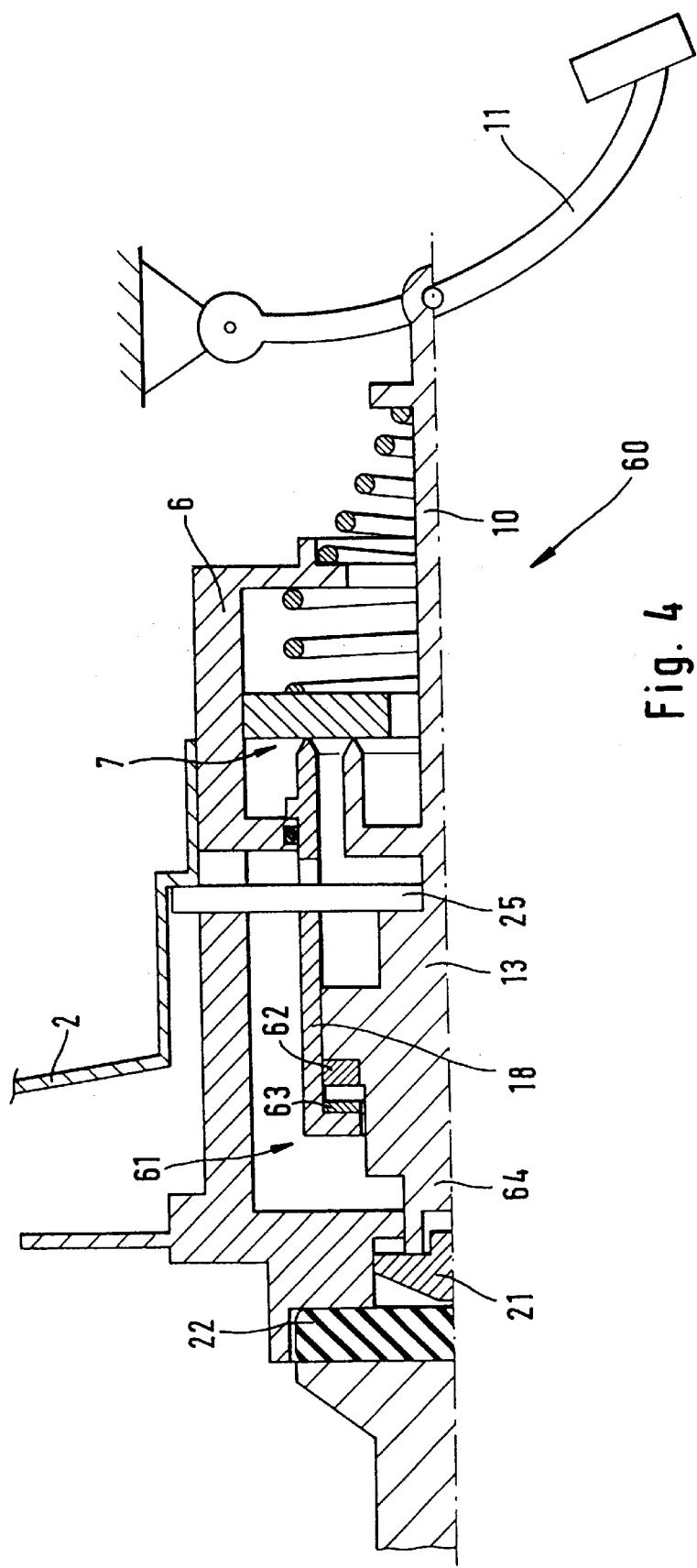
FIG. 4 shows the fourth embodiment of the brake force booster in an illustration corresponding to FIG. 1.

Brake force boosters 40, 50, and 60 of FIGS. 2 or 3 or 4, respectively, differ from the above-described brake force booster 1 according to FIG. 1 basically only by the clutch device that is associated with the sliding sleeve 18. Accordingly, the other coincident parts will not be explained again and have been assigned like reference numerals.

In the brake force booster 40 of FIG. 2, the clutch device 41 is formed of a supporting member 42, interposed between the valve piston 13 and the thrust piece 21, with an outer circumferential surface 43 and a radial shoulder 44 with which cooperates a clutch member 45 that has the form of a radially inwards biassed spring arm or of several spring arms distributed in a circumferential direction. The function of the release sleeve 35 according to FIG. 1 is assumed by a stepped rim 46 on the valve piston 13 when, after a panic braking operation which causes locking engagement of the clutch member 45 and interaction with the radial shoulder 44, the brake pedal 11 along with the valve piston 13 is withdrawn and the valve piston 13 lifts from the supporting member 42 in opposition to the brake actuation direction. Subsequently, the stepped rim 46 moves to abut on an inclined surface 47 on the inside of the resilient clutch member 45 and moves the clutch member 45 out of engagement with the radial shoulder 44.

Moreover, the mode of operation of the brake force booster 40 corresponds to that of the brake force booster 1. The same applies to the brake force boosters which will be described in the following and are illustrated in FIGS. 3 and 4.

In the brake force booster 50 according to FIG. 3, there is provision of a magnetic clutch device 51. Device 51 comprises an annular permanent magnet 52. Instead, there may also be provision of a plurality of individual unipolar magnets distributed in a circumferential direction. Pointing axially in the brake actuation direction, the permanent magnet 52 is fitted to an annular projection 53 of a cup-shaped supporting member 54 which accommodates the cylindrical front end 55 of the valve piston 13 and with a sleeve-shaped axial projection 56 which receives the rear stem end of the mushroom-shaped thrust piece 21, is slidably supported in the control housing 6 and makes catch at the rear end of the thrust piece 21. Opposed to the permanent magnet 52 at an axial distance therefrom is a soft iron ring 57 which is fitted to an inner flange 58 at the front end of the sliding sleeve 18.

The axial distance between the permanent magnet 52 and the soft iron ring 57 and the magnet strength of the permanent magnet 52 are sized so that in the event of the above-described advance movement of the valve piston 13 upon panic braking, the soft iron ring 57 will move into the range of effect of the permanent magnet 52 and stick to it so that the sliding sleeve 18 is coupled magnetically to the supporting member 54 and is thereby supported on the reaction member 22 in the brake actuation direction. This magnetic coupling is removed only when after panic braking the sliding sleeve 18 is prevented by the transverse member 25, which has returned until abutment on the booster housing 2, from further return movement together with the supporting member 54.

The brake force booster 60 according to FIG. 4 is also furnished with a magnetic coupling device 61 which includes a permanent magnet 62 and a soft iron ring 63 on the sliding sleeve 18. However, different from the embodiment according to FIG. 3, there is no special supporting member. The valve piston 13 rather has a front end 64 which corresponds to the shape of the supporting member 54 in FIG. 3 and assumes the supporting function for the sliding sleeve 18 so that the front end 64 of the valve piston 13 can be referred to as a supporting member integrated in the valve piston.

What is claimed is:

1. Brake force booster with a panic brake function for automotive vehicles, comprising:

a booster housing having its inner space subdivided, by a movable partition wall, into a vacuum chamber and a working chamber, a control housing connected to the partition wall, said control housing including a control valve which controls the pressure in the working chamber, said control valve being operable by means of an input member, wherein said control valve includes a vacuum sealing seat on a sliding sleeve movable relative to the control housing for the purpose of controlling the connection between the working chamber and the vacuum chamber, an atmosphere sealing seat designed on a valve piston connected to the input member for controlling the connection between the working chamber and the atmosphere, an elastic valve member cooperating with the vacuum and atmospheric sealing seats, wherein a quick actuation of the input member results in exceeding of a predetermined relative displacement between the valve piston and the control housing and, hence, the lifting of the atmosphere sealing seat from the valve member causes an abrupt rise of the boosting force which is transmitted from the control housing to a reaction member, to which the brake force transmitted from the valve piston by way of a thrust piece member is also applied, a clutch device which serves for supporting the sliding sleeve in the brake actuation direction on the reaction member, the clutch device including a supporting member on a side towards the reaction member and a clutch member on a side of the sliding sleeve, wherein the clutch member is adapted to move into engagement with the supporting member and is disengaged by withdrawing the valve piston in opposition to the direction of brake actuation, wherein the supporting member is configured as a component part which transmits the brake force.

2. Brake force booster as claimed in claim 1, wherein the supporting member is configured as a catch sleeve into which the clutch member is resiliently engaged.

3. Brake force booster as claimed in claim 2, wherein the clutch member is provided by at least one radially deflectable spring arm.

4. Brake force booster as claimed in claim 3, wherein the spring arm or spring arm is arranged as a separate part on the sliding sleeve.

5. Brake force booster as claimed in claim 3, wherein said at least one spring arm is connected integrally with the sliding sleeve.

6. Brake force booster as claimed in claim 2, wherein said clutch member includes a release sleeve which, upon retraction of the valve piston, meets a stop and performs a relative movement in relation to the sliding sleeve, thereby disengaging the clutch member.

7. Brake force booster as claimed in claim 2, wherein said clutch member includes an inclined surface which, by its movement into contact with the valve piston wherein when said clutch is withdrawn from said valve piston, said clutch member is released.

8. Brake force booster as claimed in claim 7, wherein the inclined surface is arranged on the clutch member and cooperates with a stepped rim on the valve piston.

9. Brake force booster as claimed in claim 1, further including a magnet for coupling engagement between the supporting member and the clutch member.

10. Brake force booster as claimed in claim 9, wherein the magnet is a permanent magnet.

11. Brake force booster as claimed in claim 9, wherein the magnet is secured to the supporting member.

12. Brake force booster as claimed in claim 9, wherein the clutch member includes at least one magnetizable component part which is mounted on the sliding sleeve.

13. Brake force booster as claimed in claim 12, wherein the magnetizable component part is a soft iron ring which is axially opposite to the magnet.

14. Brake force booster as claimed in claim 1, wherein the supporting member is formed of the integrally shaped front end of the valve piston.

* * * * *

UNITED STATES PATENT AND TRADEMARK OFFICE
CERTIFICATE OF CORRECTION

PATENT NO.    : 6,408,738 B1
DATED         : June 25, 2002
INVENTOR(S)   : Ralf Harth et al.

It is certified that error appears in the above-identified patent and that said Letters Patent is hereby corrected as shown below:

<u>Column 6,</u>
Line 17, change "spring arm or spring arm" to -- spring arm or each spring arm --.

Signed and Sealed this

Eighteenth Day of February, 2003

JAMES E. ROGAN
*Director of the United States Patent and Trademark Office*